(12) United States Patent
Yeckley et al.

(10) Patent No.: US 8,367,576 B2
(45) Date of Patent: Feb. 5, 2013

(54) CHARGE-DISPERSING ALPHA PRIME-BETA PRIME SIAlON

(75) Inventors: Russell L. Yeckley, Derry Township, PA (US); Jie Wu, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 161 days.

(21) Appl. No.: 12/948,906

(22) Filed: Nov. 18, 2010

(65) Prior Publication Data

US 2012/0126039 A1    May 24, 2012

(51) Int. Cl.
*C04B 35/599* (2006.01)

(52) U.S. Cl. ........ 501/98.3; 501/98.2; 501/92; 428/702; 428/704

(58) Field of Classification Search ................. 501/97.1, 501/97.2, 97.4, 92, 98.2, 98.3; 428/702, 428/704
See application file for complete search history.

(56) References Cited

U.S. PATENT DOCUMENTS

| | | | |
|---|---|---|---|
| 4,127,416 A | 11/1978 | Lumby et al. | |
| 4,252,768 A * | 2/1981 | Perkins et al. | 264/332 |
| 4,547,470 A | 10/1985 | Tanase et al. | |
| 4,563,433 A | 1/1986 | Yeckley et al. | |
| 4,711,644 A | 12/1987 | Yeckley et al. | |
| 4,826,791 A | 5/1989 | Mehrotra et al. | |
| 4,880,755 A | 11/1989 | Mehrotra et al. | |
| 5,059,768 A | 10/1991 | Hatanaka et al. | |
| 5,066,423 A | 11/1991 | Kubo et al. | |
| 5,108,659 A | 4/1992 | Ogasawara et al. | |
| 5,118,646 A | 6/1992 | Sieben et al. | |
| 5,200,374 A | 4/1993 | Yamada et al. | |
| 5,302,329 A | 4/1994 | Shiogai et al. | |
| 5,413,972 A | 5/1995 | Hwang et al. | |
| 6,066,583 A * | 5/2000 | White | 501/98.1 |
| 6,124,225 A | 9/2000 | Tien et al. | |
| 6,471,734 B1 | 10/2002 | Yeckley | |
| 6,693,054 B1 | 2/2004 | Yeckley | |
| 6,964,933 B2 * | 11/2005 | Yeckley | 501/98.1 |
| 7,049,256 B2 * | 5/2006 | Yeckley | 501/98.2 |
| 7,094,717 B2 | 8/2006 | Yeckley | |
| 7,223,709 B2 * | 5/2007 | Yeckley | 501/98.2 |
| 7,309,673 B2 | 12/2007 | Yeckley | |
| 2004/0033883 A1 * | 2/2004 | Yeckley | 501/98.2 |
| 2004/0102305 A1 * | 5/2004 | Yeckley | 501/98.2 |

FOREIGN PATENT DOCUMENTS

| | | |
|---|---|---|
| EP | 0250593 B1 | 9/1991 |
| EP | 0344642 B1 | 10/1993 |

OTHER PUBLICATIONS

A. Bellosi et al., "Development and Characterization of Electroconductive Si3Ni4-TiN Composites," J. European Ceramic Society, 9 (1992) 83-93.

M. Herrmann et al., "Densification, Microstructure and Properties of Si3N4-Ti(C,N) Composites," J. European Ceramic Society, 12 (1993) 287-296.

L. Zivkovic et al., "Microstrutural Characterization and Computer Simulation of Conductivity in Si3N4-TiN Composites," J. Alloys and Compounds, 373 (2004) 231-236.

(Continued)

*Primary Examiner* — Karl Group

(74) *Attorney, Agent, or Firm* — Matthew W. Gordon, Esq.

(57) ABSTRACT

Industrial blast nozzles are disclosed which have liners made, at least in part, from a SiAlON-containing ceramic material which has a surface resistance of about 12 megaOhms or less and an erosion rate of about $1.9 \times 10^{-4}$ $cm^3/g$ or less. The SiAlON-containing ceramic material preferably contains a two-phase SiAlON, silicon carbide, and a conductive phase that is one or more of titanium nitride, tantalum nitride, zirconium nitride, and titanium carbide.

18 Claims, 3 Drawing Sheets

OTHER PUBLICATIONS

Hong Pen, "Spark Plasma Sintering of Si3N4-Based Ceramics," Doctorial Dissertation, Dept. of Inorganic Chemistry, Stockholm University, Stockholm, Sweden 2004.

L. Gao et al., "Preparation and Properties of TiN-Si3N4 Composites," J. European Ceramic Society, 24 (2004) 381-386.

G. Blugan et al., "Fractography, Mechanical Properties, and Microstructure of Commercial Silicon Nitride-Titanium Nitride Composites," J. Am. Ceram. Soc., 88 [4] 926-933 (2005).

Kennametal Inc., Abrasive Flow Products Catalogue, Latrobe, PA, US (2008).

\* cited by examiner

CHARGE-DISPERSING ALPHA PRIME-BETA PRIME SIAlON

FIELD OF THE INVENTION

The present invention relates to industrial blast nozzles made from SiAlON-containing ceramics that have improved static electricity-dissipation while maintaining or improving the erosion resistance over conventional SiAlON-containing ceramics. The present invention also relates to methods of making such industrial blast nozzles.

BACKGROUND OF THE INVENTION

Industrial blast nozzles, which will hereinafter and in the appended claims be referred to simply as "blast nozzles", are used to direct abrasive-bearing fluids against workpieces for purposes ranging from preparing or conditioning a workpiece surface to machining or cutting apart the workpiece. The fluid may be a gas, such as compressed air, or a liquid, such as high pressure water. The abrasives are in particulate form and their physical properties are selected based upon the type of job to be performed and the characteristics of the workpiece. Blast nozzles are sometimes classified by their design and operational mode as venturi nozzles, straight bore nozzles, angle nozzles, and wet blast nozzles.

Blast nozzles are subjected to intense internal abrasion from the abrasive flow they carry and direct, making it necessary to construct them, at least in part, from wear-resistant materials, e.g., cermet and ceramic materials. One such ceramic material is SiAlON, a lightweight ceramic that offers a service life and durability similar to the much heavier cermet tungsten carbide. This weight-reduction advantage reduces operator fatigue and has made SiAlON a popular choice as a blast nozzle material in the last decade. Examples of SiAlONs are described in U.S. Pat. Nos. 4,127,416, 4,547,470, 4,563,433, 4,711,644, 4,826,791, 4,880,755, 5,059,768, 5,066,423, 5,108,659, 5,118,646, 5,200,374, 5,302,329, 5,413,972, 6,124,225, 6,471,734 B1, 6,693,054 B1, 7,223,709 B2, 7,309,673 B2, and 7,094,717 B2.

However, a drawback to the use of SiAlON is that it generally lacks the electrical conductivity of tungsten carbide. In some cases, SiAlON's poor electrical conductivity results in the buildup on a blast nozzle of undesirable levels of static electrical charge resulting from the sliding contact of the abrasive particles flowing through it. This can lead to undesirable and uncontrolled electrical spark discharges. The static discharge problem has limited the use of the SiAlONs in blast nozzle applications to those applications in which some unexpected electrical spark discharge can be safely tolerated.

In the 1980's and early 1990's, work was done on modifying SiAlONs to render them sufficiently electrically conductive to be machined by electric discharge machining (EDM) or to make them suitable for use as electrical heating elements or glow plugs. Examples of such work are disclosed in U.S. Pat. Nos. 5,059,768, 5,066,423, and 5,108,659. The first and last patents of this group teach that improved electrical conductivity may result from the addition to the SiAlON-containing ceramic of at least one of titanium nitride, titanium carbide, and titanium carbonitride. The remaining patent in the group greatly expands the list of possible additives to include one or more conductive compounds of carbides, nitrides, oxides and their composite compounds of transition metals in Groups IVa, Va, and VIa of the Periodic Table in conjunction with an addition of the less conductive material silicon carbide to lessen the batch-to-batch, sample-to-sample, and even intra-sample variability of electrical resistivity. However, although such efforts improved the usability of SiAlONs in electrical heating applications, abrasion resistance is not a concern in such applications and so there was little interest in measuring the wear resistance properties of such modified SiAlONs. Indeed, none of the patents in the above-mentioned group provide any teachings at all on the abrasive resistance characteristics of these modified SiAlONs. Thus, until now, two decades later, these modified SiAlONs have not been used in applications requiring a high level of wear resistance.

SUMMARY OF THE INVENTION

The present invention solves the long-standing problem in the blast nozzle art of electrical static charge buildup in SiAlON blast nozzles by constructing blast nozzles, at least in part, from a SiAlON-containing ceramic material that has improved electrical conductivity over the SiAlON ceramic materials conventionally employed in blast nozzles. The electrical conductivity, measured in terms of surface resistance, of the SiAlON-containing ceramic materials of the present invention is less than or equal to about 12 megaOhms. In contrast, conventional SiAlONs used for blast nozzle applications have surface resistances on the order of about 40 megaOhms. In some preferred embodiments of the present invention, the wear resistance of the SiAlON-containing ceramic materials employed in the blast nozzle is actually superior to that of conventional SiAlON blast nozzle materials.

Some preferred embodiments of the present invention provide SiAlON-containing ceramics comprising (a) an alpha prime/beta prime SiAlON matrix, (b) a conductive phase consisting of at least one selected from the group of titanium nitride, tantalum nitride, zirconium nitride, and titanium carbide, and (c) silicon carbide. In preferred embodiments of the present invention, these components are present in the following volumetric amounts: from about 60 to about 85 percent alpha prime-beta prime SiAlON; from about 8 to about 15 percent conductive phase; and from about 5 to about 25 percent silicon carbide. It is also preferred that the volumetric ratio of alpha prime to beta prime phases in the alpha prime/beta prime SiAlON be in the range of from about 0.4 to about 1.0.

The present invention includes all types of blast nozzle liners comprising the foregoing SiAlON-containing ceramics at least in part of their abrasive flow-carrying regions and blast nozzles having such liners. The present invention also includes methods of making such liners and blast nozzles.

BRIEF DESCRIPTION OF THE DRAWINGS

The criticality of the features and merits of the present invention will be better understood by reference to the attached drawings. It is to be understood, however, that the drawings are designed for the purpose of illustration only and not as definitions of the limits of the present invention.

DESCRIPTION OF PREFERRED EMBODIMENTS

Figure 1:
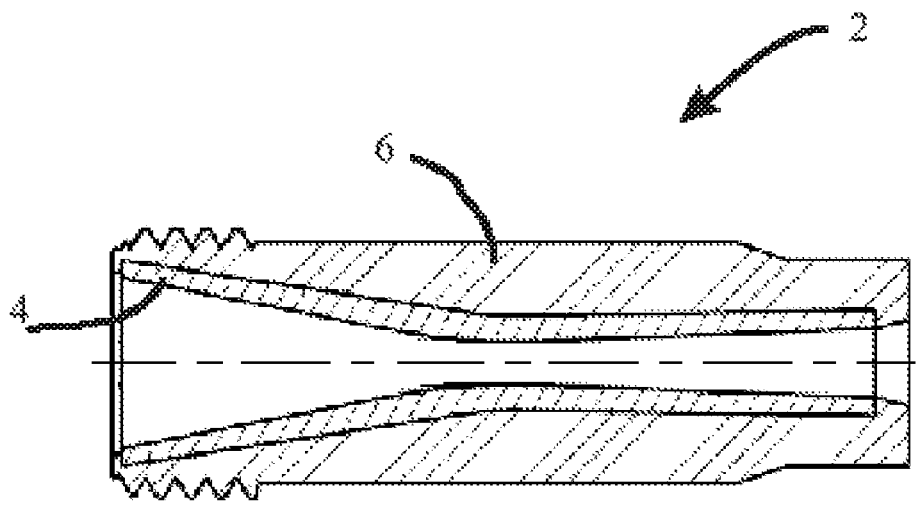
FIG. 1 is a cross-sectional schematic view of a venturi blast nozzle according to an embodiment of the present invention having a threaded polyethylene jacket and a SiAlON-containing ceramic liner.

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Unless otherwise noted, all compositions are expressed in terms of volumetric percent. The phrase "SiAlON-containing ceramic material" is to be construed as meaning a ceramic material that contains at least 60 percent SiAlON. SiAlON may contain an alpha prime (or alpha') phase, a beta prime (or beta') phase, a combination of an alpha-prime phase and a beta-prime phase, and one or more other phases such as, for example, a glassy phase and/or a crystalline phase. The alpha-prime SiAlON phase is of the formula $M_xSi_{12-(m+n)}Al_{m+n}O_nN_{16-n}$ where M is Yb, La, Y or other lanthanides and where the theoretical maximum of x is 2, the value of n ranges between greater than 0 and less than or equal to 2.0, and the value of m ranges between greater than or equal to 0.9 and less than or equal to 3.5. The beta-prime SiAlON phase is of the formula $Si_{6-z}Al_zO_zN_{8-z}$ where 0 is less than z, and z is less than or equal to 4.2. In the case where M is yttrium, the crystalline phases may include YAG (yttrium aluminum garnet) which is a cubic phase of the formula $Y_3Al_5O_{12}$; YAM which is a monoclinic phase of the formula $Y_4Al_2O_9$; N-YAM which is a monoclinic phase of the formula $Y_4Si_2O_7N_2$; and Y—N-alpha-Wollastonite which is a monoclinic phase of the formula $YSiO_2N$.

Some of embodiments of the present invention provide compositions of SiAlON-containing ceramics. These compositions comprise (a) an alpha prime/beta prime SiAlON matrix, (b) a conductive phase consisting of at least one selected from the group of titanium nitride, tantalum nitride, zirconium nitride, and titanium carbide, and (c) silicon carbide. The alpha prime/beta prime SiAlON matrix is in the range of from about 60 to about 85 percent of the composition. Lesser amounts of this matrix result in degradation of mechanical properties and difficulty in densification while greater amounts of this matrix result in insufficient electric conductivity and erosion resistance. More preferably, alpha prime/beta prime SiAlON matrix is in the range of from about 77 to about 81 percent of the composition. It is also preferred that the volumetric ratio of alpha prime to beta prime phases in the SiAlON be in the range of from about 0.4 to about 1.0. Lesser amounts of this alpha prime result in insufficient erosion resistance while greater amounts result in undesirable brittleness. The conductive phase is in the range of from about 8 to about 15 percent of the composition. Lesser amounts of the conductive phase provide insufficient electrical conductivity to prevent undesirable static electricity buildup in the blast nozzles while greater amounts result in low wear resistance. More preferably, the conductive phase is in the range of from about 8 to about 12.5 percent of the composition. The silicon carbide is in the range of from about 5 to about 25 percent of the composition. Lesser amounts result in poor wear resistance and greater amounts result in undesirable brittleness. More preferably, the silicon carbide is in the range of from about 8 to about 12 percent of the composition.

The present invention includes the use of these preferred compositions as liners for blast nozzles. The present invention also includes the use as blast nozzle liners of any SiAlON-containing ceramic material known in the art which has a combination of a surface resistance of about 12 mega Ohms or less and an erosion rate of about $1.9 \times 10^{-4}$ cm$^3$/g or less. Surface resistances higher than about 12 megaOhms may result in unsatisfactory levels of static electrical charge buildup during the use of the blast nozzle and erosion rate higher than about $1.9 \times 10^{-4}$ may result in unsatisfactorily short nozzle lifetimes. Such compositions are particularly preferred when they contain silicon carbide in the range of between about 10 and 15 percent. Silicon carbide levels below this range do not contribute significantly to the wear resistance and silicon carbide levels above this range result in undesirable brittleness.

Figure 2:
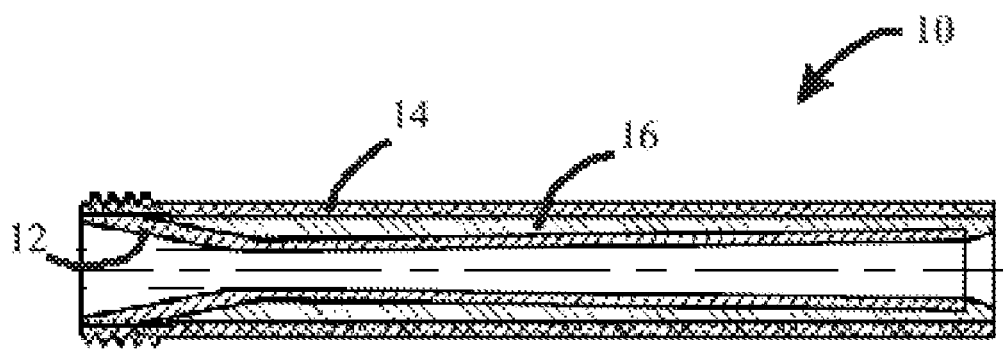
FIG. 2 is a cross-sectional schematic view of a venturi blast nozzle according to an embodiment of the present invention having a threaded aluminum jacket and a SiAlON-containing ceramic liner.
Figure 3:
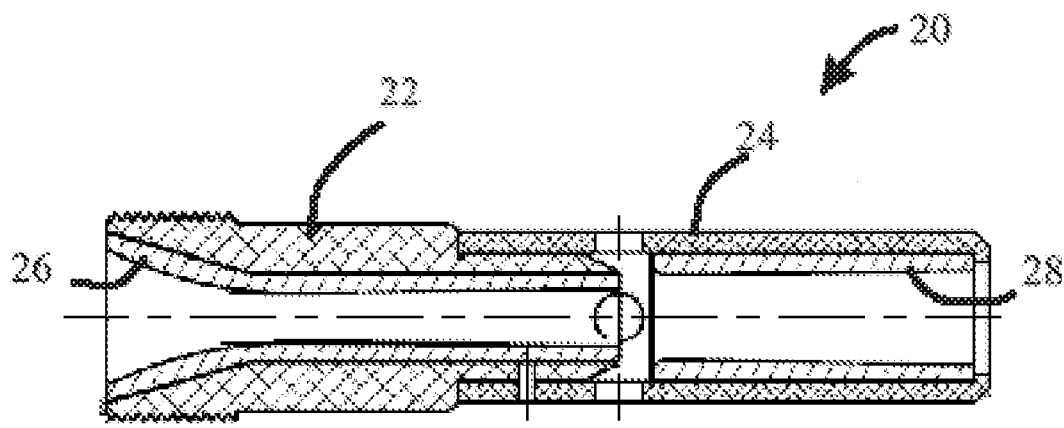
FIG. 3 is a cross-sectional schematic view of a double venturi blast nozzle according to an embodiment of the present invention having a threaded aluminum jacket and a two-part SiAlON-containing ceramic liner.
Figure 4:
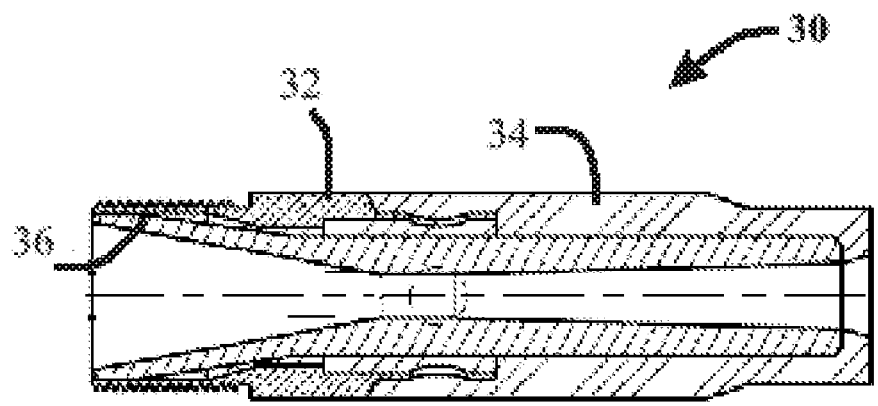
FIG. 4. is a cross-sectional schematic view of a wide throat long venturi blast nozzle according to an embodiment of the present invention having brass threads, a polyurethane jacket, and a SiAlON-containing ceramic liner.

The present invention includes all types of blast nozzle liners comprising the foregoing SiAlON-containing ceramic materials at least in part of their abrasive flow-carrying regions and blast nozzles having such liners. FIGS. 1-5 show examples of blast nozzles having ceramic liners comprising SiAlON-containing ceramic materials according the present invention. Referring now to FIG. 1, there is shown a cross-sectional view of a venturi ballast nozzle 2. Blast nozzle 2 has a SiAlON-containing ceramic material liner 4 and a threaded polyethylene jacket 6. FIG. 2 shows a cross-sectional view of another style of a venturi blast nozzle 10. Blast nozzle 10 has a SiAlON-containing ceramic material liner 12, and a threaded aluminum jacket 14. Interposed between the liner 12 and the jacket 14 is a polymeric filler material to position liner 12. FIG. 3 shows a cross-sectional view of a double venturi blast nozzle 20. Blast nozzle 20 has a two-part aluminum jacket consisting of a threaded entrance portion 22 and an exit portion 24. It also has a two-part liner consisting of an entrance portion 26 and an exit portion 28. FIG. 4 shows a cross-sectional view of a wide throat long venturi blast nozzle 30. Blast nozzle 30 has two-part jacket comprising threaded brass entrance portion 32 and a polyurethane exit portion 34. The blast nozzle has a single-piece liner, liner 36.

Figure 5:
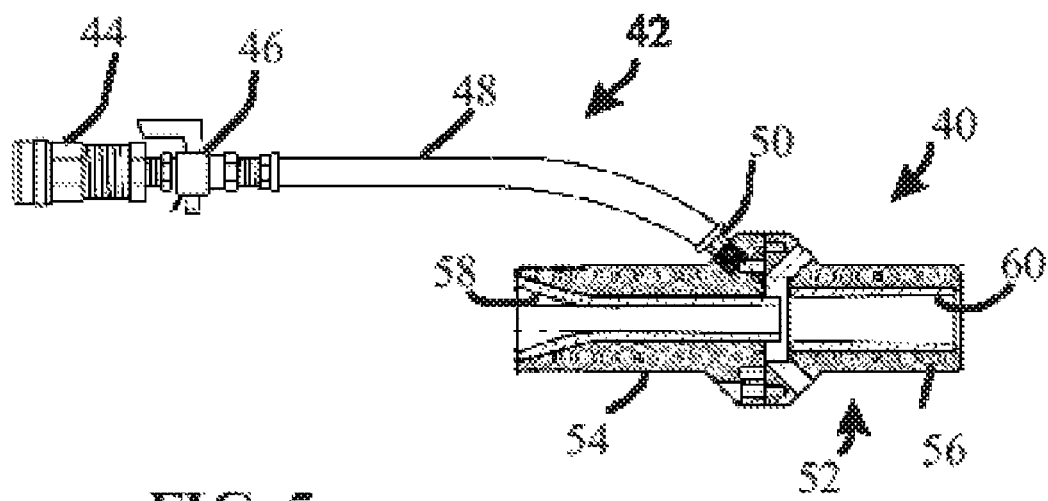
FIG. 5 is a cross-sectional schematic view of a water induction blast nozzle according to an embodiment of the present invention having a two-part threaded aluminum jacket and a two-part SiAlON-containing ceramic liner.

The blast nozzles shown in FIGS. 1-4 use a gas, typically compressed air, as the abrasive-particle carrying fluid. The problem of static electrical charge is most acute when gas is used as the abrasive-particle carrying fluid because of the poor electrical conductivity of gases. Although the problem may be greatly diminished or eliminated when a liquid is the abrasive-particle carrying fluid, nonetheless, such blast nozzles and liners for such nozzles are also within the contemplation of the present invention when they comprise the foregoing SiAlON-containing ceramic materials. FIG. 5 shows an example of a water induction blast nozzle 40 in conjunction with a water-supply system 42. Water supply system 42 has a first fitting 44 for connecting to a low pressure water source, a control valve 46, a hose 48, and a second fitting 50 which attaches the hose 48 to the blast nozzle 40. The blast nozzle 40 has two-part aluminum jacket 52 comprising a threaded portion 54 and an exit portion 56. The blast nozzle 40 also has a two-part liner consisting of an entrance portion 58 and an exit portion 60.

The SiAlON-containing ceramic materials, blast nozzle liners, and blast nozzles may be made by any processes known in the art for making conventional SiAlON-containing ceramic materials, blast nozzle liners, and blast nozzles. In general, powders of the starting materials, e.g., silicon nitride, aluminum nitride, aluminum oxide, titanium nitride, and silicon carbide are ball or attritor milled together with one or more sinter aids, e.g., a rare earth oxide, in the presence of a milling fluid and a pressing aid or binder. The milled powder is dried and then compacted either axially or isostatically to a desired intermediate or final shape of a blast nozzle liner or a part thereof. The compacted powder is then heated to remove the pressing aid or binder and then heated further to liquid phase sinter the compact into a sintered article. After cooling the sintered article to room temperature, the sintered article may be processed further to its final shape. The finished blast nozzle liner is then surrounded by a jacket material, optionally with a filler material, to make a blast nozzle.

The following examples are given for illustration of some preferred embodiments of the present invention, but are not to be construed as limiting the present invention.

EXAMPLES

Examples 1-4

Appropriate amounts of powders of silicon nitride, aluminum nitride, aluminum oxide, titanium nitride, silicon carbide, and $Yb_2O_3$ (as a sinter aid) were ball milled together. The particle sizes, D50, as measured by the laser diffraction method, of each of these powders were as follows: silicon nitride 0.9-1.3 microns; aluminum nitride 0.8-1.8 microns; titanium nitride 0.17 microns; silicon carbide 1 microns; and $Yb_2O_3$ sinter aid 4 microns. Table 1 gives the composition of each sample as measured by X-ray diffraction. The weight of each sample batch was 1050 grams. The ball milling was done in a 4700 cubic centimeter ball mill with polyurethane lining. The ball mill has 0.64 centimeter (¼ inch) cylindrical SiAlON milling media using 45% isopropyl alcohol as a milling fluid and 6.5% rosin and Carbowax as a pressing aid and binder. Each sample batch was milled for 23 hours then dried and die pressed. The green pressings of Examples 1 and 2 were sintered at 1800° C. under nitrogen at 1 atmosphere pressure for 45 minutes and then hot isostatically pressed at 1800° C. for 30 minutes at about 138 MPa. The green pressing of Examples 3 and 4 were sintered at 1800° C. under nitrogen at 1 atmosphere pressure for 45 minutes.

Appropriate size samples of each of Examples 1-4 were used to measure hardness, fracture toughness, surface resistance, and erosion rate. The results of the measurements are reported in Table 2. The hardness was measured by the Vicker's indentation method. The fracture toughness was measured by the fracture toughness indentation method. The surface resistance was measured by the ASTM D257 method. The erosion rate was measured by the ASTM G76-83 method.
Comparative Samples 1-2

Two comparative samples were made and tested in a manner similar to Examples 3 and 4. The compositions of the comparative samples are reported in Table 1 and the results of the tests are reported in Table 2.

TABLE 1

| Identification | TiN (vol %) | SiC (vol %) | Total Sialon (vol. %) | Alpha:Beta Ratio |
|---|---|---|---|---|
| Example 1 | 9.2 | 11.0 | 79.8 | 0.80 |
| Example 2 | 9.7 | 9.6 | 80.7 | 0.47 |
| Example 3 | 12.1 | 9.8 | 78.1 | 0.53 |
| Example 4 | 11.8 | 9.1 | 79.1 | 0.62 |
| Comparative 1 | 7.6 | 11.0 | 81.4 | 0.48 |
| Comparative 2 | 0.0 | 0.0 | 100 | 0.33 |

It is clear from Table 1 that the principal difference between the compositions of Examples 1-4 and that of the comparative sample is that the amount of the conductive phase, TiN, present in those embodiments of the present invention is significantly higher than that of the comparative sample.

TABLE 2

| Identification | Vickers Hardness (GPa) | Fracture Toughness, $K_{IC}$ ($MPa\, m^{0.5}$) | Surface Resistance (MOhms) | Erosion Rate ($cm^3/g$) |
|---|---|---|---|---|
| Example 1 | 19.4 | 5.2 | 7.3 | 1.03E-04 |
| Example 2 | 16.1 | 6.7 | 0.125 | 1.15E-04 |
| Example 3 | 15.5 | 5.1 | 0.05 | 1.63E-04 |
| Example 4 | 15.7 | 5.7 | 11.8 | 1.29E-04 |
| Comparative 1 | 15.9 | 5.9 | greater than 40.0 | 1.27E-04 |
| Comparative 2 | 15.0 | 6.0 | greater than 40.0 | 1.91E-04 |

As can be seen in Table 2, the embodiments of the present invention all had hardness, fracture toughness, and erosion rate values similar to those of the comparative sample. However, in contrast to the high surface resistance of the comparative sample, all of the embodiments of the present invention had greatly reduced surface resistance. Thus, the present invention provides a blast nozzle material that has physical and abrasion resistance properties similar to that of conventional blast nozzle material while providing greatly superior electrical charge dispersing capability.

While only a few embodiments of the present invention have been shown and described, it will be obvious to those skilled in the art that many changes and modifications may be made thereunto without departing from the spirit and scope of the present invention as described in the following claims. All patent applications, patents, and all other publications referenced herein are incorporated herein in their entireties to the full extent permitted by law.

What is claimed is:

1. A liner for a blast nozzle comprising a SiAlON-containing material having a surface conductivity of less than or equal to about 12 megaOhms and an erosion rate of about $1.9 \times 10^{-4}$ $cm^3/g$ or less, wherein the SiAlON-containing ceramic material has a composition comprising, in volume percent, from about 60 to about 85% two-phase SiAlON, from about 5 to about 25% silicon carbide, and from about 8 to about 15% of a conductive phase, wherein the two-phase SiAlON has an alpha-prime phase to beta-prime phase ratio in the range of about 0.4 to about 1.0, and the conductive phase comprises at least one material selected from the group consisting of titanium nitride, tantalum nitride, zirconium nitride, and titanium carbide.

2. The liner of claim 1, wherein the two-phase SiAlON is in the range of about 77 to about 81%.

3. The liner of claim 1, wherein the silicon carbide is the range of about 8 to about 12%.

4. The liner of claim 1, wherein the conductive phase is in the range of about 8 to about 12.5%.

5. A blast nozzle comprising a liner, the liner comprising a SiAlON-containing ceramic material having a surface conductivity of less than or equal to about 12 megaOhms and an erosion rate of about $1.9 \times 10^{-4}$ $cm^3/g$ or less, wherein the SiAlON-containing ceramic material has a composition comprising, in volume percent, from about 60 to about 85% two-phase SiAlON, from about 5 to about 25% silicon carbide, and from about 8 to about 15% of a conductive phase, wherein the two-phase SiAlON has an alpha-prime phase to beta-prime phase ratio in the range of about 0.4 to about 1.0, and the conductive phase comprises at least one material selected from the group consisting of titanium nitride, tantalum nitride, zirconium nitride, and titanium carbide.

6. The blast nozzle of claim 5, wherein the two-phase SiAlON is in the range of about 77 to about 81%.

7. The blast nozzle of claim 5, wherein the silicon carbide is the range of about 8 to about 12%.

8. The blast nozzle of claim 5, wherein the conductive phase is in the range of about 8 to about 12.5%.

9. A method of making a liner for a blast nozzle comprising the steps of:
   a) providing a powder mixture;
   b) pressing the powder mixture to form a compact; and
   c) sintering the compact to form a SiAlON-containing ceramic material article;
   wherein the SiAlON-containing ceramic material article has a surface conductivity of less than or equal to 12 megaOhms and an erosion rate of about $1.9 \times 10^{-4}$ cm$^3$/g or less, wherein the SiAlON-containing ceramic material has a composition comprising, in volume percent, from about 60 to about 85% two-phase SiAlON, from about 5 to about 25% silicon carbide, and from about 8 to about 15% of a conductive phase, wherein the two-phase SiAlON has an alpha-prime phase to beta-prime phase ratio in the range of about 0.4 to about 1.0 and the conductive phase comprises at least one material selected from the group consisting of titanium nitride, tantalum nitride, zirconium nitride, and titanium carbide.

10. The method of claim 9, wherein the step of providing a powder mixture further comprises the steps of:
    d) providing powders of silicon nitride, aluminum nitride, aluminum oxide, titanium nitride, silicon carbide, and at least one selected from the group consisting of Yb$_2$O$_3$, Y$_2$O$_3$, La$_2$O$_3$; and
    e) milling the powders together to create the powder mixture.

11. The method of claim 9, wherein the two-phase SiAlON is in the range of about 77 to about 81%.

12. The method of claim 9, wherein the silicon carbide is the range of about 8 to about 12%.

13. The method of claim 9, wherein the conductive phase is in the range of about 8 to about 12.5%.

14. A method of making a blast nozzle comprising the steps of:
    a) providing a liner comprising a SiAlON-containing ceramic material;
    b) providing a jacket; and
    c) assembling the liner and the jacket to form the blast nozzle;
    wherein the SiAlON-containing ceramic material article has a surface conductivity of less than or equal to about 12 megaOhms and an erosion rate of about $1.9 \times 10^{-4}$ cm$^3$/g or less, wherein the SiAlON-containing ceramic material has a composition comprising, in volume percent, from about 60 to about 85% two-phase SiAlON, from about 5 to about 25% silicon carbide, and from about 8 to about 15% of a conductive phase, wherein the two-phase SiAlON has an alpha-prime phase to beta-prime phase ratio in the range of about 0.4 to about 1.0, and the conductive phase comprises at least one material selected from the group consisting of titanium nitride, tantalum nitride, zirconium nitride, and titanium carbide.

15. The method of claim 14, wherein the step of providing a powder mixture further comprises the steps of:
    c) providing powders of silicon nitride, aluminum nitride, aluminum oxide, titanium nitride, silicon carbide, and at least one selected from the group consisting of Yb$_2$O$_3$, Y$_2$O$_3$, La$_2$O$_3$; and
    d) milling the powders together to create the powder mixture.

16. The method of claim 14, wherein the two-phase SiAlON is in the range of about 77 to about 81%.

17. The method of claim 14, wherein the silicon carbide is the range of about 8 to about 12%.

18. The method of claim 14, wherein the conductive phase is in the range of about 8 to about 12.5%.

* * * * *